Jan. 29, 1952     J. L. FOY     2,583,557
POWER-DRIVEN TRUCK FOR AIR CARGO USE
Filed May 20, 1947
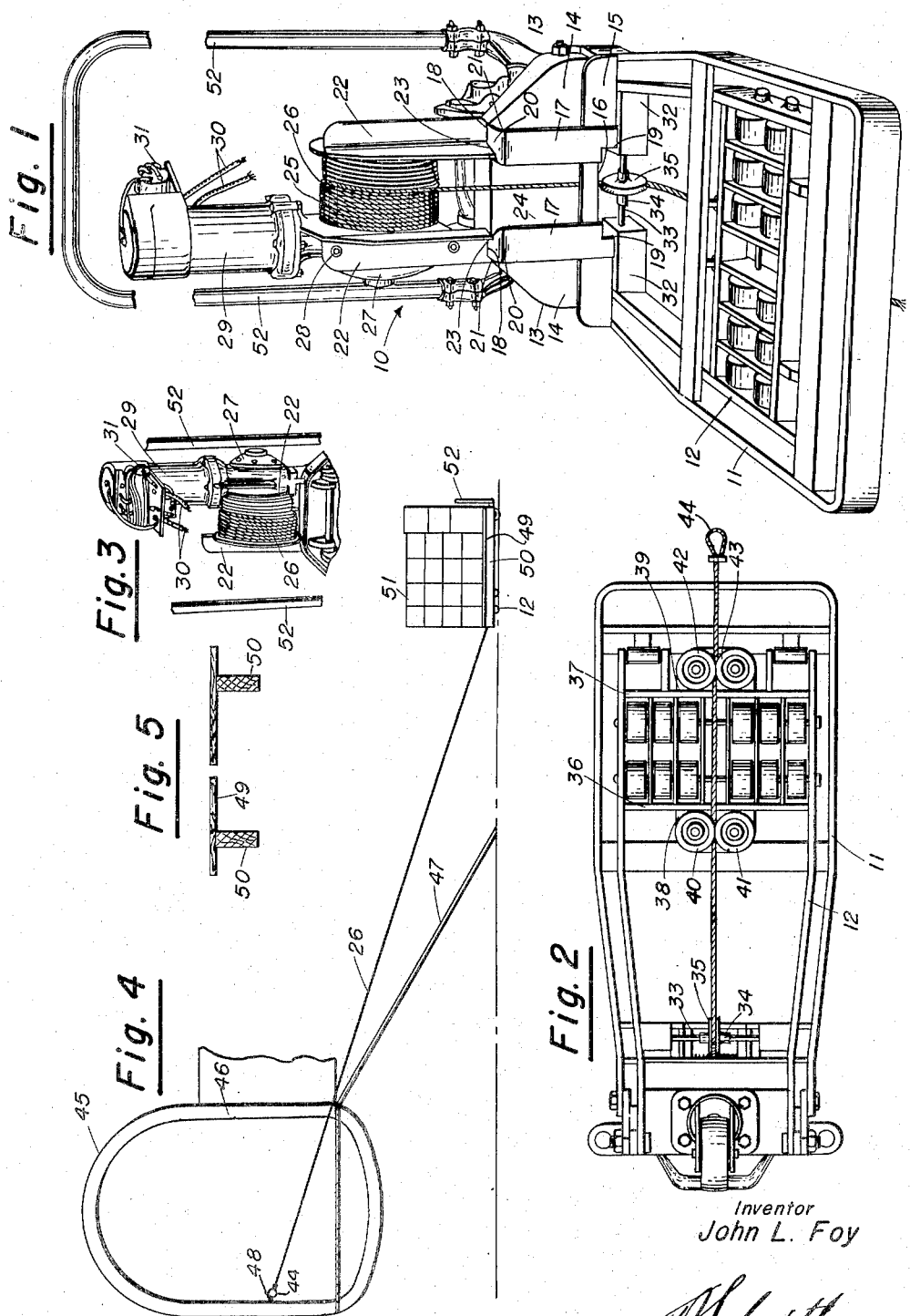
Inventor
John L. Foy Patented Jan. 29, 1952

2,583,557

UNITED STATES PATENT OFFICE 2,583,557

POWER-DRIVEN TRUCK FOR AIR CARGO USE

John L. Foy, United States Navy, Dayton, Ohio

Application May 20, 1947, Serial No. 749,369

2 Claims. (Cl. 254—2)

(Granted under the act of March 3, 1883, as amended April 30, 1928; 370 O. G. 757)

The present invention relates to a power-driven truck for air cargo use.

In the past, in the loading of aircraft by manual labor, losses have resulted from damage or pilferage to the cargo being loaded, as well as damage to the aircraft. In the manual loading many man hours were required to load the cargo, which resulted in time schedules of planes being behind.

It is an object of the present invention to provide a device, simple in construction, one that is easily handled, and one that may be stowed on a plane and requiring a minimum of storage space.

Another object of the present invention is the provision of a cargo truck that may be hand operated or electrical operated.

A still further object of the present invention is the provision of a device having means for moving the device when loaded.

A still further object of the present invention is the provision of means for driving the means for moving the device.

A still further object of the present invention is the provision of mechanical means for expediting cargo loading.

Other objects of the present invention will become apparent hereinafter from an examination of the specification and claims when taken in conjunction with the accompanying drawings, wherein:

Figure 1 is a perspective view of a cargo truck equipped with the present device.

Figure 2 is a bottom plan view of a cargo truck.

Figure 3 is a rear elevational view of the power unit, winch and cable, parts being shown fragmentarily.

Figure 4 is a section through the fuselage of an airplane and illustrating cargo ready for delivery to the fuselage.

Figure 5 is an end elevational view of a cargo truck platform.

Referring to the drawings, the numeral 10 represents a cargo truck, having frames 11 and 12 and bracket plates 13. The cargo truck being of well known construction in the art to which it appertains, it is therefore not deemed necessary to describe all of the parts.

To the end face 14 of the bracket plates 13 there is secured by spot welding or bolting a transverse plate 15 having a cutout portion 16 that is midway the ends thereof. To the transverse plate 15 there is secured by spot welding or any other suitable means vertical plates 17 having L-shaped arms 18. The lower end of each of the vertical plates 17 have a cutout portion 19, and the arms a cutout portion 20. The outer edges 21 of the arms 18 are spot welded to the bracket plates 13. Interposed between the bracket plates 13 is a pair of angle T-plates 22 that are spot welded to the bracket plates 13 and to the cutout portions 20 at 23. Interposed between the vertical T-plates 22 is a cable guard plate 24. Mounted between the T-plates 22 for rotative movement is a winch 25 that carries a cable 26, the shaft of the winch at one end having a gear (not shown) in a housing 27. To one of the T-plates 22 and secured thereto by bolts 28 is an electric motor 29 having a gear (not shown) that meshes with the gear (not shown) in the housing 27. The motor 29 is of the reverse type having cables or conduits 30 for connection to a source of power, and a switch 31 for operating the motor.

The frame 12 carries a pair of U-shaped brackets 32 that are in spaced relation and in alignment. Interposed between the brackets 32 is a shaft 33 and mounted on the shaft for slidable and rotative movement is a tubular element 34 that carries a guide pulley wheel 35. The transverse bars 36 and 37 as shown in Figure 2 are each provided respectively with flange plates 38 and 39, and to the flange plate 38 there is pivotally mounted a pair of sheaves 40 and 41 and to the plate 39 a pair of sheaves 42 and 43. The cable 26 is trained around the pulley wheel 35, through the sheaves 40, 41, 42, and 43, the end of the cable being provided with a securing loop 44.

In Figure 4 of the drawings the numeral 45 represents the fuselage of an airplane having an opening 46 and a ramp 47. The cable 26 is played out and the loop 44 secured to a suitable bracket 48. Superposed upon the truck is a platform 49 having runners 50 as shown in Figure 5, the platform being loaded with cargo 51.

In the operation of the present invention any number of platforms 49 may be loaded with cargo adjacent to an airplane cargo door. The platforms are loaded with cargo 51 and as the platforms are loaded the cargo truck 10 is placed under one of the platforms, the handle 52 of the truck manipulated to operate a pallet mechanism carried by the truck which lifts the frame 12 and the cargo. When the truck is palletized, the switch 31 is thrown, the motor rotates and being connected to the winch 25 rotates the winch in a clockwise direction winding the cable 26 on the drum and moving the cargo laden truck into the fuselage 45 of an airplane. If the cargo is to be moved in the fuselage, it may be moved by the electrical mechanism on the truck by simply fastening the loop to some other fixture in the fuselage. When the truck has been moved to the point in the fuselage for stowage, the handle 52 is manipulated and the frame 12 released from its extended position and the truck pulled from under the platform.

The invention described herein may be manufactured and used by or for the Government of the United States of America for governmental purposes without the payment of any royalties thereon or therefor.

What I claim is:

1. In a powered cargo truck having a base frame with wheels thereon and a lift frame fitted over the base frame, the combination of an electrically powered winch secured to the base frame at one end thereof, a pulley system secured to the underside of said base frame in substantially the same plane as the wheels, and a cable engageable with said winch and said pulley system adapted to be secured at one end to a fixed position whereby the cargo truck pulls itself unidirectionally on said cable.

2. In a powered cargo truck having a base frame with wheels thereon and a lift frame fitted over the base frame the combination of a U-shaped member secured to said base frame at an end thereof, an electrically powered winch secured to said base frame in the opening in the U-shaped member, a pulley sheave rotatably mounted on said base frame under said winch, a pair of guiding sheaves under said base frame in substantially the same plane as the wheels in said base frame, and a cable engageable with said winch, pulley sheaves and guiding sheaves for moving the cargo truck therealong.

JOHN L. FOY.

REFERENCES CITED

The following references are of record in the file of this patent:

UNITED STATES PATENTS

| Number | Name | Date |
|---|---|---|
| 457,842 | Rourk | Aug. 18, 1891 |
| 2,120,042 | Remde | June 7, 1938 |
| 2,306,231 | Smith et al. | Dec. 22, 1942 |
| 2,344,417 | Schmidt et al. | Mar. 14, 1944 |